United States Patent
Kim et al.

(10) Patent No.: US 10,477,562 B2
(45) Date of Patent: Nov. 12, 2019

(54) CENTRAL MANAGEMENT SERVER FOR SPECIAL COMMUNICATION AND ACCESS METHOD OF THE CENTRAL MANAGEMENT SERVER

(71) Applicant: INDUSTRY-ACADEMIC COOPERATION FOUNDATION, YONSEI UNIVERSITY, Seoul (KR)

(72) Inventors: Kwang-Soon Kim, Seoul (KR); Seong-Lyun Kim, Seoul (KR); Moon Kyu Jo, Seoul (KR); Xilei Chen, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 0 days.

(21) Appl. No.: 15/881,125

(22) Filed: Jan. 26, 2018

(65) Prior Publication Data
US 2019/0069305 A1    Feb. 28, 2019

(30) Foreign Application Priority Data
Aug. 25, 2017    (KR) .................. 10-2017-0107828

(51) Int. Cl.
| | | |
|---|---|---|
| H04W 72/08 | (2009.01) | |
| H04W 16/14 | (2009.01) | |
| H04W 28/16 | (2009.01) | |
| H04W 72/04 | (2009.01) | |
| H04W 64/00 | (2009.01) | |
| H04W 80/02 | (2009.01) | |
| H04W 80/04 | (2009.01) | |

(52) U.S. Cl.
CPC ......... *H04W 72/085* (2013.01); *H04W 16/14* (2013.01); *H04W 28/16* (2013.01); *H04W 64/00* (2013.01); *H04W 72/0453* (2013.01); *H04W 80/02* (2013.01); *H04W 80/04* (2013.01)

(58) Field of Classification Search
CPC ............... H04W 72/085; H04W 16/14; H04W 72/0453; H04W 64/00; H04W 80/02; H04W 80/04
See application file for complete search history.

(56) References Cited

U.S. PATENT DOCUMENTS

| | | | |
|---|---|---|---|
| 2014/0029516 A1* | 1/2014 | Heo ................. | H04W 72/0453 370/328 |
| 2016/0033488 A1* | 2/2016 | Chou .................. | G01N 1/2813 435/6.1 |
| 2016/0088486 A1* | 3/2016 | Taher .................... | H04W 16/14 455/454 |

FOREIGN PATENT DOCUMENTS

KR    10-2015-0022874 A    3/2015

* cited by examiner

*Primary Examiner* — Kyaw Z Soe

(57) ABSTRACT

A central management server for special communication may include: a spectrum sensing information acquisition unit for acquiring spectrum sensing information from spectrum sensing servers; an OP map generation unit for generating an OP value for each channel if there is an access request from a second layer; and a channel allocation unit configured to allocate a channel based on the OP value to a user terminal of the second layer requesting access if there is an access request from the second layer. The channel allocation unit may allocate a channel corresponding to the highest OP value from among the available channels, if there are available channels unused by both a first layer and a lower-level layer, and may select and allocate a channel unused by the first layer but used by the lower-level layer, if there are no such available channels.

12 Claims, 6 Drawing Sheets

CENTRAL MANAGEMENT SERVER FOR SPECIAL COMMUNICATION AND ACCESS METHOD OF THE CENTRAL MANAGEMENT SERVER

CROSS-REFERENCE TO RELATED APPLICATIONS

The present patent application claims priority under 35 U.S.C. § 119(a) to the Korean Patent Application No. 10-2017-0107828, filed on Aug. 25, 2017, which is incorporated herein by reference in its entirety.

BACKGROUND

1. Technical Field

Embodiments of the present disclosure relate to a central management server for special communication and to an access method of the central management server.

2. Description of the Related Art

In the field of special communication, such as disaster communication and emergency communication, high reliability and high speed are of utmost importance. Existing modes of special communication were typically achieved over dedicated communication networks, but in order to meet the need for quick communication unconstrained by time and location, it is necessary to utilize existing communication networks in implementing special communication.

Recently, in the United States, the Citizens Broadband Radio Service (CBRS) has been proposed as a method of increasing frequency efficiency. It is expected that, by establishing a private network based on the Spectrum Sensing Engine (SAS) outside the frequency band of 3550-3700 MHz used by existing users, it would be possible to increase the range and capacity of LTE services. However, unlike urban regions having well-established public networks, rural regions may be limited in the availability of such services and hence may not be fully equipped for implementing special communication, which inherently must be achieved as quickly as possible.

Thus, there is a need for a more efficient frequency management system that can ensure quick and reliable special communication.

SUMMARY

An aspect of the present disclosure is to present a central management server and an access method of the central management server that utilizes an existing communication network to enable special communication in a quick manner and with high reliability.

One aspect of the present disclosure provides a central management server for special communication that is a part of a communication system, which includes the central management server and a multiple number of spectrum sensing servers. The central management server may include: a spectrum sensing information acquisition unit configured to acquire spectrum sensing information from the multiple spectrum sensing servers; an OP map generation unit configured to generate an OP value, which represents the probability of successful communication, for each channel if there is an access request from a second layer, which is an access layer for special communication; and a channel allocation unit configured to allocate a channel based on the OP value to a user terminal of the second layer requesting access if there is an access request from the second layer.

Here, the channel allocation unit may allocate a channel corresponding to the highest OP value from among the available channels, if there are available channels unused by both a first layer and a lower-level layer, and may select and allocate a particular channel unused by the first layer but used by the lower-level layer, if there are no available channels unused by both the first layer and the lower-level layer.

The central management server may further include a communication mode determination unit configured to determine a communication mode of the second layer user terminal to which the channel has been allocated.

If a channel being used by the lower-level layer is allocated, the user terminal of the lower-level layer using the channel may not stop using the channel.

If a channel being used by the lower-level layer is to be allocated, the channel allocation unit may allocate a channel corresponding to the highest OP value from among channels being used.

The OP map generation unit may generate an OP value for each channel in consideration of the user terminal density and the spectrum sensing information of the first layer, which is an upper-level layer of the second layer, and the lower-level layer of the second layer, where the OP value represents the probability of successful communication.

If there is an access request from the lower-level layer, the channel allocation unit may allocate a channel corresponding to the highest OP value from among the channels that are unused by the first layer and the second layer.

Another aspect of the present disclosure provides an access method for a central management server for special communication in a communication system that includes the central management server and a multiple number of spectrum sensing servers. The access method may include: (a) acquiring spectrum sensing information from the multiple spectrum sensing servers; (b) generating an OP value, which represents the probability of successful communication, for each channel if there is an access request from a second layer, which is an access layer for special communication; and (c) allocating a channel based on the OP value to a user terminal of the second layer requesting access if there is an access request from the second layer. Step (c) may include allocating a channel corresponding to a highest OP value from among available channels, if there are available channels unused by both the first layer and the lower-level layer, and selecting and allocating a particular channel unused by the first layer but used by the lower-level layer, if there are no available channels unused by both the first layer and the lower-level layer.

An embodiment of the present disclosure can provide the advantage of enabling special communication over an existing communication network with high speed and high reliability.

Additional aspects and advantages of the present disclosure will be set forth in part in the description which follows, and in part will be obvious from the description, or may be learned by practice of the present disclosure.

DETAILED DESCRIPTION

Figure 1:
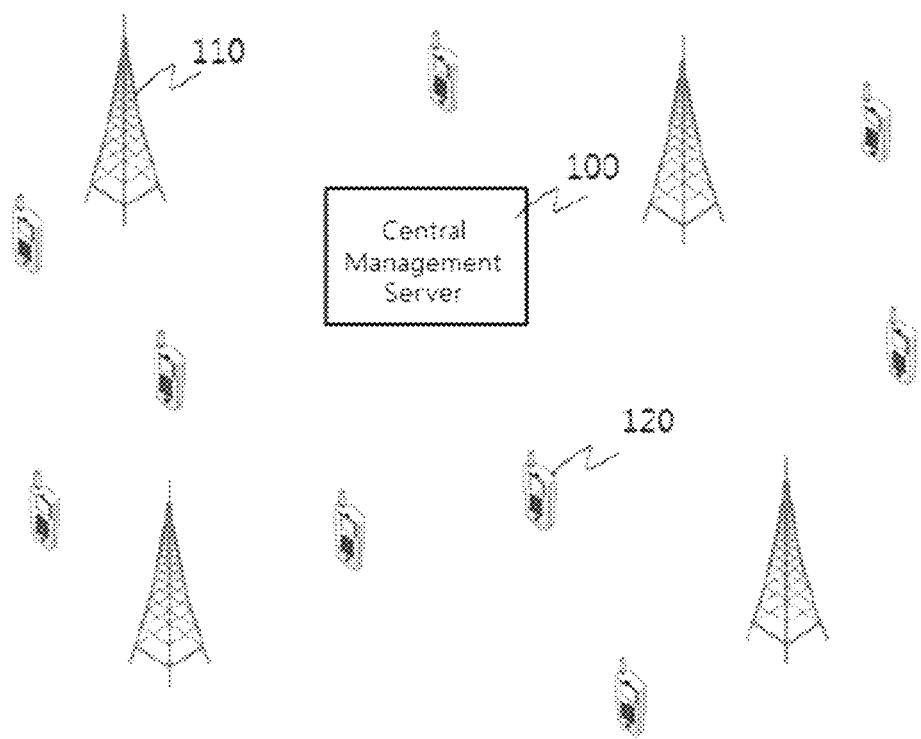
FIG. 1 illustrates the overall structure of a communication system for special communication according to an embodiment of the present disclosure.

As the present disclosure allows for various changes and numerous embodiments, particular embodiments will be illustrated in the drawings and described in detail in the written description. However, this is not intended to limit the present disclosure to particular modes of practice, and it is to be appreciated that all changes, equivalents, and substitutes that do not depart from the spirit and technical scope of the present disclosure are encompassed in the present disclosure. In describing the drawings, similar reference numerals are used for similar elements.

Certain embodiments of the present disclosure are described below in more detail with reference to the accompanying drawings.

FIG. 1 illustrates the overall structure of a communication system for special communication according to an embodiment of the present disclosure.

Referring to FIG. 1, a communication system for special communication according to an embodiment of the present disclosure may include a central management server 100, a multiple number of spectrum sensing servers 110, and a multiple number of user terminals 120.

As regards the present disclosure, special communication refers to communication that requires great urgency such as disaster communication and emergency communication, and an aspect of the present disclosure provides a method of enabling special communication using an existing communication network without establishing a separate communication network dedicated to special communication.

The multiple spectrum sensing servers 110 may detect whether or not certain channels are being used by the multiple number of user terminals 120. The multiple spectrum sensing servers 110 may be distributed in different regions and may detect whether or not specific frequency bands are being used in their respective regions either periodically or whenever a particular event occurs.

According to an embodiment of the present disclosure, the spectrum sensing servers 110 may detect whether or not specific channels are being used for various bands such as the LTE band, Wi-Fi band, digital TV band, etc.

Each of the multiple spectrum sensing servers 110 may be connected with the central management server 100 in a wired or wireless manner to be able to communicate with the central management server 100. Each of the spectrum sensing servers 110 may transmit spectrum sensing information to the central management server 100.

The central management server 100 may serve to receive the spectrum sensing information for each region from the spectrum sensing servers 110 and, based on the spectrum sensing information for each region thus received, determine the channel and communication mode that are to be used by a particular user terminal 120.

According to a preferred embodiment of the present disclosure, the communication access types of the user terminals 120 that are controlled by the central management server 100 with respect to the frequency bands and communication modes used can be divided into a multiple number of layers (preferably, into a first to a fourth layer), and the central management server 100 can determine the channel and communication mode based on the communication access type used by the user terminal 120 requesting communication.

Figure 2:
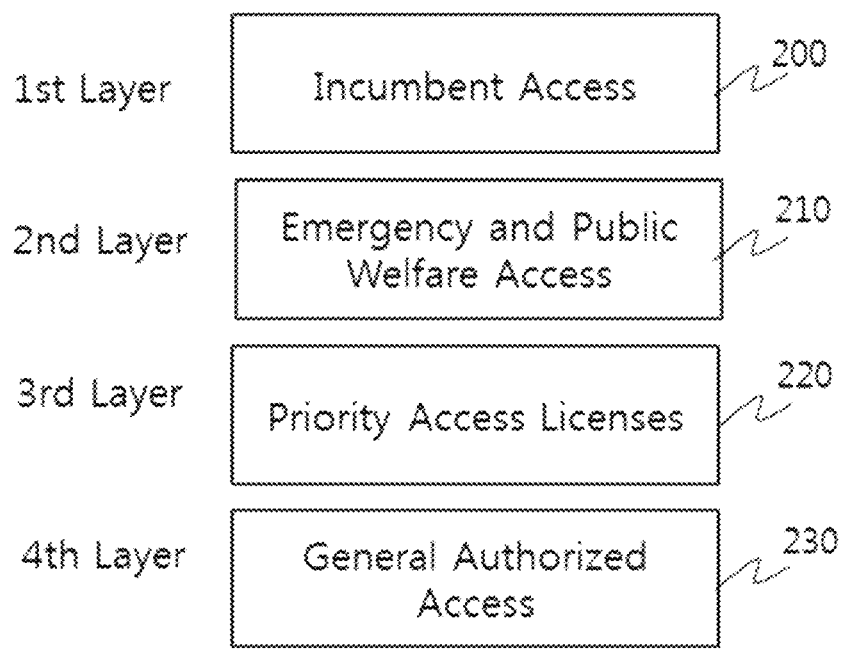
FIG. 2 illustrates layers associated with communication access types according to an embodiment of the present disclosure.

FIG. 2 illustrates layers associated with communication access types according to an embodiment of the present disclosure.

Referring to FIG. 2, the communication access types may be divided into four layers 200, 210, 220, 230, and the communication access types of the user terminals 120 may generally be configured beforehand. For example, a first user terminal used by a particular user may be a terminal configured for access via the first layer, while a second user terminal used by another user may be a terminal configured for access via the third layer.

The first layer 200 may be the highest-level layer and may be used for governmental and military communications. A user terminal belonging to the first layer may have the highest priority in using a channel. A terminal belonging to the first layer may use a channel without considering the use status of channels by lower-level layers. For example, if a first layer requires the use of a particular channel currently being used by a third layer, then the use of the channel by the third layer may be halted.

The second layer 210 may be a layer for special communication and may be used for disaster communication and emergency communication. The second layer can have dedicated user terminals configured for use, or user terminals typically belonging to the third layer and fourth layer can be permitted access via the second layer for special communication.

The third layer 220 may be a layer having a lower priority compared to the first layer and may use a channel unused by the first layer and second layer to perform an access such that interference with the lower-level layers are minimized. As described later on, the third layer can experience interference by the second layer during the use of a channel. The third layer can be, for example, allocated to mobile communication providers.

The fourth layer 230 may be the lowest-level layer using the most limited channels and may be allocated with channels unused by the first to third layers. This can be a layer allocated, for example, to a smaller-scale service provider. The fourth layer 230 can experience interference from an upper-level layer at a certain probability even during use of a particular channel.

An aspect of the present disclosure is to configure the second layer for special communication and thereby provide a method of performing special communication over an existing communication network without establishing a separate communication network.

Referring again to FIG. 1, in the event of an access request from a user terminal 120, the central management server 100 may allocate a channel and determine the communication mode based on the layer of the user terminal.

If a particular user terminal requests access for the purpose of special communication as a second layer, the central management server 100 may allocate the channel that is to be used in consideration of the channel usage information of the first layer, which is an upper-level layer, and the third and fourth layers, which are lower-level layers, and also determine the mode of communication.

As a default, the central management server 100 may allocate the channel having the highest probability of successful communication, from among the available channels, to the terminal accessing as the second layer. Here, the probability of successful communication refers to the probability that the communication will not fail due to the allocated channel being used by an upper-level layer.

If a particular user terminal requests access for the purpose of special communication as a second layer, the central management server 100 may, in cases where there are no available channels, allocate a channel being used by the third layer or fourth layer. In such cases, the communication by the third layer or fourth layer need not be stopped, unlike those cases where a first layer occupies a channel currently in use. Consequently, the second layer and the lower-level layer may perform communication while experiencing interference.

Figure 3:
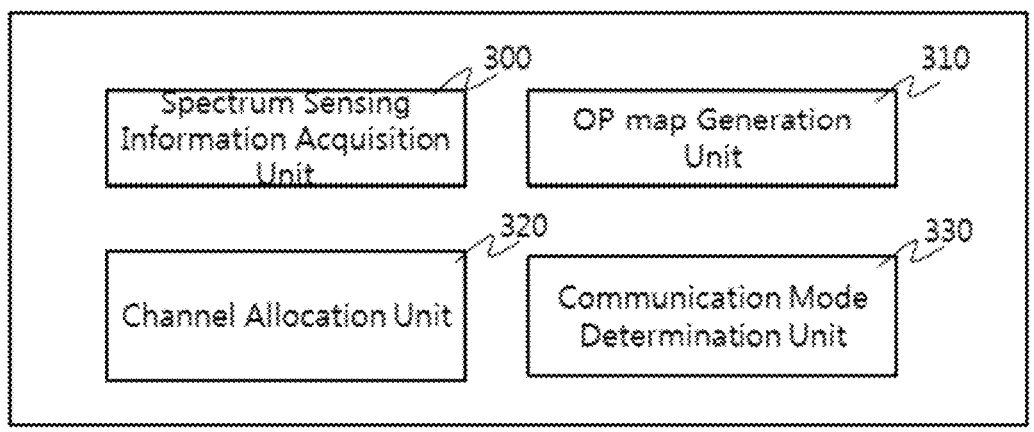
FIG. 3 is a block diagram illustrating the composition of a central management server 100 according to an embodiment of the present disclosure.

FIG. 3 is a block diagram illustrating the composition of a central management server 100 according to an embodiment of the present disclosure.

Referring to FIG. 3, a central management server 100 according to an embodiment of the present disclosure may include a spectrum sensing information acquisition unit 300, an OP map generation unit 310, a channel allocation unit 320, and a communication mode determination unit 330.

The spectrum sensing information acquisition unit 300 may receive spectrum sensing information from the multiple spectrum sensing servers 110. Of course, the central management server 100 itself can include a spectrum sensing module to perform spectrum sensing over a particular region. The spectrum sensing information of each region acquired at the spectrum sensing information acquisition unit 300 may be stored in a separate database.

The OP (opportunistic probability) map generation unit 310 may generate a map of OP values, which represent probabilities of communication success, based on the spectrum sensing information for each region acquired at the spectrum sensing information acquisition unit 300, the layer of the user terminal requesting access, the transmission power of the user terminal, and the density of the user terminals.

For example, in predicting the OP value of each region, the OP map generation unit 310 can calculate the density of user terminals at the point where the user terminal requesting access is located as the average number of user terminals requesting access per unit area.

From the perspective of the second layer, the OP value can also be defined as the probability of the signal-to-interference-plus-noise ratio (SINR) of the second layer user terminal exceeding a preconfigured threshold while ensuring communication in the upper-level and lower-level layers.

The OP map generation unit 310 can calculate the optimal SINR OP value θ for predicting the OP value of each region by using Equation 1 below, which can incorporate the density $\lambda_1$ of the upper-level or lower-level layer terminal, the transmission power ($P_1$), the density $\lambda_2$ of the second layer user terminal, and the transmission power ($P_2$) of the second layer terminal.

[Equation 1]

$$\theta^* = \max\left[\bar{\theta},\right.$$

$$\arg\max_{\theta} \int_{x>0}\int_{r>0} \mathcal{P}_s(r,\theta)\int_{\theta>0} \mathcal{P}_s(r,e^\theta-1)\exp(-\pi\lambda_2$$

$$\left.\hat{\phi}_2^{2/a}d^2\rho_0(e^\theta-1))d\theta f_r(r)f_r(x)drdx\right]$$

Where $\bar{\theta}$ satisfies the following equation: $\bar{\theta}\lambda_2\hat{\phi}_2 P_1^{2/a}\rho_0(\bar{\theta})(1-\tau) =$ $$\lambda_1 P_2^{2/a}(\tau + \rho(\bar{\theta})\tau - \rho(\bar{\theta})).$$

$$\mathcal{P}_s(r,\theta) = \frac{1}{2\pi}\int_0^{2\pi} \frac{P_2}{P_2 + P_1\theta d^a(r^2 - 2xr\cos(t) + x^2)^{-2/a}}$$

$$dt \times \exp\left(-\lambda_1\left[\int_{r+x}^{\infty} \frac{2\pi P_1\theta d^a y^{-a+1}}{P_2 + P_1\theta d^a y^{-a}} dy +\right.\right.$$

-continued $$\int_{|r-x|}^{r+x} \frac{2a\cos(r^2 - x^2 - y^2)P_1\theta d^a y^{-a+1}}{P_2 + P_1\theta d^a y^{-a}} dy +$$

$$\left.\left.\int_{\max(0,r-x)}^{|r-x|} \frac{2\pi P_1\theta d^a y^{-a+1}}{P_2 + P_1\theta d^a y^{-a}} dy + \right]\right)$$

$$\rho_0(\theta) = \theta^{2/a}\int_0^\infty \frac{du}{1+u^{2/a}}, f_r(r) = 2\pi\lambda_1 re^{-\pi\lambda_1 r^2},$$

$$\hat{\phi}_2 = \int_{x>0}\int_{r>0} \mathcal{P}_s(r,\theta), f_r(r)f_r(x)drdx$$

The SINR coverage refers to the probability of the SINR exceeding a preset threshold θ in a particular region within the network, and the OP map generation unit 310 can calculate the average SINR coverage of the second layer terminal for all applicable threshold values. From the perspective of the second layer, the optimal SINR threshold θ can be calculated that can maximize the efficiency of the second layer while ensuring network quality for other layers, where the efficiency of the second layer can be calculated by using the average SINR coverage mentioned above.

The OP map generation unit 310 can calculate the OP value, i.e. the probability of successful communication, for the second layer with respect to the threshold θ, and the OP value can be defined as the probability of the SINR of the second layer terminal exceeding the threshold. Simply put, the OP map generation unit 310 may calculate the OP value for each channel, representing the probability of successful communication by the second layer user terminal, in consideration of the densities and transmission powers of user terminals belonging to other layers.

The OP map generation unit 310 can generate the OP values for the respective covered regions based on the locations of the spectrum sensing servers 110.

Figure 4:
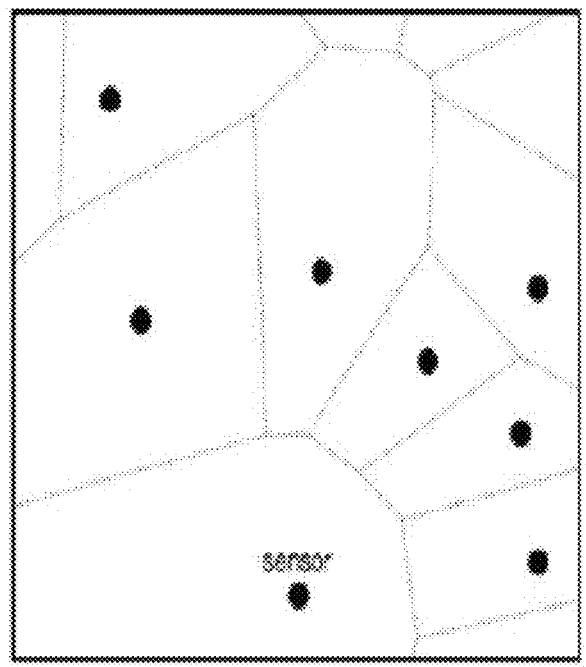
FIG. 4 illustrates an example of designating the regions to be covered by the spectrum sensing servers according to an embodiment of the present disclosure.

FIG. 4 illustrates an example of designating the regions to be covered by the spectrum sensing servers according to an embodiment of the present disclosure.

Referring to FIG. 4, the locations of the spectrum sensing servers can be managed in a table, as illustrated in FIG. 4, and the OP map generation unit 310 can calculate the OP ($O_{i,j}$) of an OP matrix for each position (i, j).

For this, the map generation unit 310 can refer to the sensing matrix of the spectrum sensing server 110 located closest to the corresponding position (i, j), and based on the sensing matrix of a particular spectrum sensing server, the OP matrix at a position located at a distance of x from the corresponding spectrum sensing server can be calculated as shown below:

Sensing matrix

| I(1) | I(2) | I(3) | I(4) | I(5) | ⋯ | I(N) |

OP matrix

| $O_{i,j}(1)$ | $O_{i,j}(2)$ | $O_{i,j}(3)$ | $O_{i,j}(4)$ | $O_{i,j}(5)$ | ⋯ | $O_{i,j}(N)$ |

Where $O_{i,j}(n) = P_s(R_{I(n)}, \theta)$ and distance $R_{I(n)}$ satisfies the following equation:

$$\frac{I}{P_1}R_{I(n)}^a - \frac{2\pi\lambda_1}{a-2}R_{I(n)}^2 - 1 = 0.$$

The channel allocation unit 320 may allocate a channel for the second layer user terminal by using the OP values generated at the OP map generation unit. The channel allocation unit 320 may check the information regarding available channels by using the spectrum sensing information and may allocate the channel having the highest OP value from among the available channels.

If all of the channels are occupied by the first layer, third layer, and fourth layer, then the channel allocation unit 320 may allocate the channel having the highest OP value from among the channels occupied by third and fourth layers, i.e. the lower-level layers, excluding the first layer. In this case, the second layer terminal may perform the communication via a channel currently being used by a third and fourth layer terminal, and the communication may be performed in spite of the resulting interferences since this would be communication made under a special circumstance. Since the channel having the highest OP value is allocated, the use of the channel by the user terminal of the other layer previously using the allocated channel could be stopped.

The communication mode determination unit 330 may determine the transmission power and transmission mode after the channel allocation and, if needed, may determine the number of antennas that are to be used for the transmission. Here, the transmission modes can include modulation mode, encoding mode, multiple access mode, and precoding mode.

Figure 5:
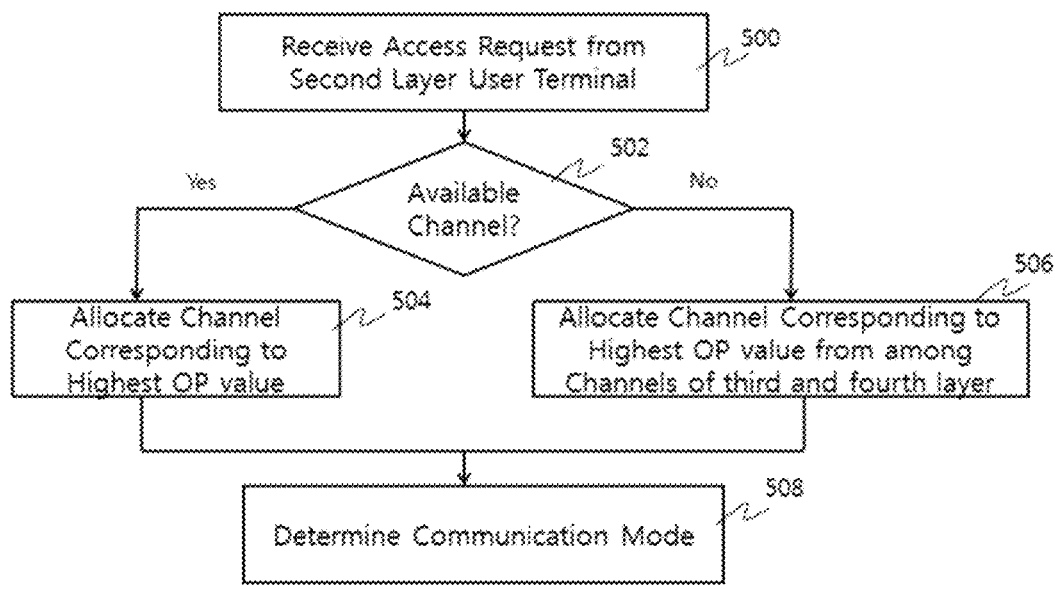
FIG. 5 is a flowchart illustrating an access operation from a second layer according to an embodiment of the present disclosure.

FIG. 5 is a flowchart illustrating an access operation from a second layer according to an embodiment of the present disclosure.

Referring to FIG. 5, the central management server may receive an access request from a second layer user terminal (step 500). Here, the second layer user terminal requesting access can be a terminal dedicated to special communication or can be a terminal that is configured as the third layer or fourth layer but is requesting access as the second layer for special communication.

When the access request is received, the central management server may decide, based on the spectrum sensing information, whether or not there are available channels that are not occupied by the first layer, which is an upper-level layer, and the third and fourth layers, which are lower-level layers (step 502).

If there is an available channel, the central management server may select the channel having the highest OP value from among the available channels, based on OP map information, and allocate the channel (step 504).

If there is no available channel, the central management server may select the channel having the highest OP value from among the channels occupied by the third layer and fourth layer, i.e. the lower-level layers, excluding the channels occupied by the first layer, i.e. the upper-level layer (step 506). The channel allocation according to step 506 is one that is vulnerable to interference from a lower-level layer, and unless the use of the channel by the lower-level layer is stopped, the special communication may be performed in the presence of interference. Since the highest OP value is allocated, the allocated channel entails a low probability of the channel being occupied by the first layer or experiencing a stop in usage by the lower-level layer.

The allocation of resources for the second layer according to an embodiment of the present disclosure has a difference over existing cognitive wireless communication in that both the upper-level layer and the lower-level layers are considered. Also, when there are no available channels, emergency communication under special circumstances may be provided under interference without ending the communication of the lower-level layer, this feature also being different from cognitive wireless communication methods that simply allocate available channels to lower-level users.

When the channel is allocated, the communication mode may be determined for the second layer user terminal requesting access (step 508). As described above, the transmission power, transmission mode, number of transmission antennas used, etc., can be determined.

When the channel has been allocated and the communication mode has been determined, the second layer user terminal that has requested access may perform special communication by way of the allocated channel and communication mode.

Figure 6:
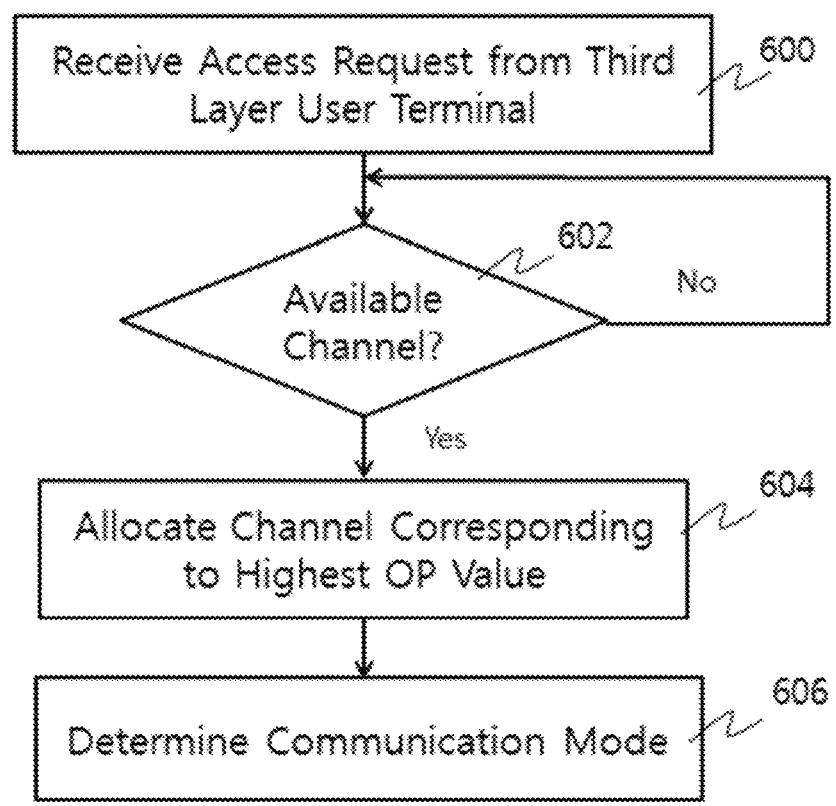
FIG. 6 is a flowchart illustrating an access operation from a third layer according to an embodiment of the present disclosure.

FIG. 6 is a flowchart illustrating an access operation from a third layer according to an embodiment of the present disclosure.

Referring to FIG. 6, the central management server may receive an access request from a third layer user terminal (step 600).

When the access request is received, the central management server may decide, based on the spectrum sensing information, whether or not there are available channels that are not occupied by the first layer and second layer, i.e. the upper-level layers (step 602).

If there is an available channel, the central management server may select the channel having the highest OP value from among the available channels, based on OP map information, and allocate the channel (step 604).

When the channel is allocated, the communication mode may be determined for the third layer user terminal requesting access (step 606).

When the channel has been allocated and the communication mode has been determined, the third layer user terminal that has requested access may perform special communication by way of the allocated channel and communication mode.

The access operation of the fourth layer may be basically similar to that of the third layer, but with a more limited range of channels compared to the third layer.

While the present disclosure is described above by way of limited embodiments and drawings that refer to particular details such as specific elements, etc., these are provided only to aid the general understanding of the present disclosure. The present disclosure is not to be limited by the embodiments above, and the person having ordinary skill in the field of art to which the present disclosure pertains would be able to derive numerous modifications and variations from the descriptions and drawings above. Therefore, it should be appreciated that the spirit of the present disclosure is not limited to the embodiments described above. Rather, the concepts set forth in the appended scope of claims as well as their equivalents and variations are encompassed within the spirit of the present disclosure.

What is claimed is:

1. A central management server for special communication, the central management server forming a part of a communication system comprising the central management server and a plurality of spectrum sensing servers, the central management server comprising:

a spectrum sensing information acquisition unit configured to acquire spectrum sensing information from the plurality of spectrum sensing servers;

an Opportunistic Probability (OP) map generation unit configured to generate an OP value for each channel if there is an access request from a second layer, the OP value being a probability of successful communication, the second layer being an access layer for special communication; and a channel allocation unit configured to allocate a channel based on the OP value to a user terminal of the second layer requesting access if there is an access request from the second layer, wherein the channel allocation unit allocates the channel corresponding to a highest OP value from among available channels if there are available channels unused by both a first layer and a lower-level layer, and the channel allocation unit selects and allocates a particular channel unused by the first layer but used by the lower-level layer if there are no available channels unused by both the first layer and the lower-level layer.

2. The central management server for special communication according to claim 1, further comprising:

a communication mode determination unit configured to determine a communication mode of the second layer user terminal having the channel allocated thereto.

3. The central management server for special communication according to claim 1, wherein, if the channel being used by the lower-level layer is allocated, a user terminal of the lower-level layer using the channel does not stop using the channel.

4. The central management server for special communication according to claim 3, wherein, if the channel being used by the lower-level layer is to be allocated, the channel allocation unit allocates the channel corresponding to a highest OP value from among channels being used.

5. The central management server for special communication according to claim 1, wherein the OP map generation unit generates an OP value for each channel in consideration of a user terminal density and the spectrum sensing information of a first layer and a lower-level layer of the second layer, the first layer being an upper-level layer of the second layer, the OP value being a probability of successful communication.

6. The central management server for special communication according to claim 1, wherein, if there is an access request from the lower-level layer, the channel allocation unit allocates a channel corresponding to a highest OP value from among channels unused by the first layer and the second layer.

7. An access method for a central management server for special communication in a communication system comprising the central management server and a plurality of spectrum sensing servers, the access method comprising:

(a) acquiring spectrum sensing information from the plurality of spectrum sensing servers;

(b) generating an Opportunistic Probability (OP) value for each channel if there is an access request from a second layer, the OP value being a probability of successful communication, the second layer being an access layer for special communication; and (c) allocating a channel based on the OP value to a user terminal of the second layer requesting access if there is an access request from the second layer, wherein said step (c) comprises allocating the channel corresponding to a highest OP value from among available channels if there are available channels unused by both the first layer and the lower-level layer, and selecting and allocating a particular channel unused by the first layer but used by the lower-level layer if there are no available channels unused by both the first layer and the lower-level layer.

8. The access method for a central management server for special communication according to claim 7, further comprising:

(d) determining a communication mode of the second layer user terminal having the channel allocated thereto.

9. The access method for a central management server for special communication according to claim 7, wherein, if the channel being used by the lower-level layer is allocated, a user terminal of the lower-level layer using the channel does not stop using the channel.

10. The access method for a central management server for special communication according to claim 9, wherein said step (c) comprises allocating the channel corresponding to a highest OP value from among channels being used, if the channel being used by the lower-level layer is to be allocated.

11. The access method for a central management server for special communication according to claim 7, wherein said step (b) comprises generating an OP value for each channel in consideration of a user terminal density and the spectrum sensing information of a first layer and a lower-level layer of the second layer, the first layer being an upper-level layer of the second layer, the OP value being a probability of successful communication.

12. The access method for a central management server for special communication according to claim 7, wherein said step (c) comprises allocating a channel corresponding to a highest OP value from among channels unused by the first layer and the second layer, if there is an access request from the lower-level layer.

* * * * *